(12) United States Patent
Cheng et al.

(10) Patent No.: US 6,516,274 B2
(45) Date of Patent: Feb. 4, 2003

(54) METHOD FOR IMAGING DISCONTINUITIES IN SEISMIC DATA USING DIP-STEERING

(75) Inventors: Yao C. Cheng, Bellaire, TX (US); Lee H. Fairchild, Mt. Hood, OR (US); John A. Farre, The Woodlands, TX (US); Steve R. May, Missouri City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 58 days.

(21) Appl. No.: 09/892,373

(22) Filed: Jun. 26, 2001

(65) Prior Publication Data

US 2002/0007247 A1 Jan. 17, 2002

Related U.S. Application Data (60) Provisional application No. 60/215,631, filed on Jun. 30, 2000.

(51) Int. Cl.$^7$ ................................................ G01V 1/28
(52) U.S. Cl. ........................................... 702/14; 702/16
(58) Field of Search ..................................... 702/14, 16

(56) References Cited

U.S. PATENT DOCUMENTS

| | | | |
|---|---|---|---|
| 5,563,949 A | 10/1996 | Bahorich et al. | 364/421 |
| 5,671,344 A * | 9/1997 | Stark | 345/419 |
| 5,724,309 A | 3/1998 | Higgs et al. | 367/48 |
| 5,831,935 A | 11/1998 | Luo et al. | 367/47 |
| 5,838,564 A | 11/1998 | Bahorich et al. | 364/421 |
| 5,884,229 A * | 3/1999 | Matteucci | 702/14 |
| 5,930,730 A | 7/1999 | Marfurt et al. | 702/16 |
| 2001/0047245 A1 * | 11/2001 | Cheng et al. | 702/14 |

FOREIGN PATENT DOCUMENTS

WO    WO 97/39367    10/1997

OTHER PUBLICATIONS

Hardage et al., 1998, "3–D Instantaneous Frequency Used as a Coherency/Continuity Parameter To Interpret Reservoir Compartment Boundaries Across an Area of Complex Turbidite Deposition", Geophysics, Vo. 63, No. 5, pp. 1520–1531.

K. J. Marfurt, et al., 1999, "Coherency Calculations in the Presence of Structural Dip", Geophysics, vol. 64, No. 1, pp. 104–111.

P. R. Vail et al., 1977, "Seismic Stratigraphy and Global Change of Sea–Level", AAPG Memoir 26.

Y. C. Cheng and S. Y. Lu, 1989, "The Binary Consistency Checking Scheme and Its Applications to Seismic Horizon Detection", IEEE Transactions on Pattern Analysis and Machine Intelligence, vol. II, No. 4.

* cited by examiner

Primary Examiner—Edward Lefkowitz
Assistant Examiner—Anthony Gutierrez
(74) Attorney, Agent, or Firm—Keith A. Bell (57) ABSTRACT

Structural and stratigraphic discontinuities are identified in a 3-D volume of seismic data samples in the presence of reflection dip, by first selecting a primary and at least one secondary direction in the volume of seismic data samples. Next, skeleton patches are identified in the volume of seismic data samples, where the skeleton patches comprise groups of connected seismic samples representing seismic horizons in the volume of seismic data samples. Apparent dip is calculated in the primary and secondary directions at each data sample within the identified skeleton patches, creating a primary and secondary direction dip volumes, respectively, at corresponding data sample locations. A filter is applied to the primary direction dip and secondary direction dip volumes to fill in values at the data sample locations not within the identified skeleton patches. Finally, a discontinuity volume is determined from calculated one-dimensional, two-trace discontinuity values in the primary and secondary directions at data sample locations. The calculated apparent dips at corresponding data sample locations in the primary and secondary direction dip volumes determine which portions of the data samples to use in the corresponding discontinuity value calculations.

13 Claims, 6 Drawing Sheets

METHOD FOR IMAGING DISCONTINUITIES IN SEISMIC DATA USING DIP-STEERING

This application claims the benefit of U.S. Provisional Application Ser. No. 60/215,631, filed Jun. 30, 2000.

FIELD OF THE INVENTION

This invention relates generally to the field of geophysical prospecting. More particularly, the invention is a method of identifying structural and stratigraphic discontinuities in a three-dimensional (3-D) seismic data volume containing dipping reflectors.

BACKGROUND OF THE INVENTION

As part of the hydrocarbon exploration and production work process, geoscience interpreters often need to recognize and map subsurface structural features, such as faults, and stratigraphic features, such as channel- or sand-body edges, in three-dimensional seismic data. However, identifying structural and stratigraphic features in 3-D seismic data can be a time consuming, subjective, and difficult process. There is a need to generate, in a computationally efficient matter, a derivative data volume (i.e., a data volume derived from the original seismic data volume), that displays clear, sharply focussed structural and stratigraphic features that can be quickly recognized and exploited in the mapping process.

Several techniques have been used in the oil industry to enhance the interpretation of structural and stratigraphic features in 3-D seismic data. A well-known technique is to transform the original amplitude data into a coherence volume using a series of one-dimensional cross-correlation calculations. For every data sample in a volume, the cross-correlation calculation is performed using a user-defined vertical window with the equivalent portion of an adjacent trace. Typically, the vertical window is the target sample in question, plus 3–7 data samples above and below the target sample, depending upon the frequency of the data. This operation is repeated for all data samples and all traces, all in the same correlation direction. The correlation direction is generally in-line, cross-line, or either diagonal direction. The resulting coherence volume typically contains values normalized between −1 and +1. For adjacent traces that are very similar, the value of the coherence sample will be close to +1, since +1 represents high correlation. This similarity, and hence correlation, is expected for adjacent traces that do not straddle a structural or stratigraphic discontinuity. For adjacent traces that do straddle a discontinuity, lack of similarity is expected. Thus, their coherence value would be closer to 0, since 0 represents no correlation. A coherence value of −1 represents negative correlation, such as high correlation with phase reversal. Alternatively, coherence can be described with the inverse notion of discontinuity, in which low coherence equals high discontinuity and high coherence equals low discontinuity. In either case, this standard technique has limitations, though, because features perpendicular to the single correlation direction are highlighted, while features parallel to the correlation direction are poorly imaged.

Normally the cross-correlation calculations are conducted parallel to time slices. This direction of calculation can create problems if the seismic data volume contains reflections that dip significantly, because a calculation that is conducted parallel to a time slice searches across the dipping reflections. When a cross-correlation calculation searches across dipping reflections, it identifies poor correlation because it is comparing different parts of the seismic wavelet. It may then map low coherence or high discontinuity to the coherence volume, even where dipping reflections are continuous.

Dip-steering reorients the search in a cross-correlation calculation so that it is conducted parallel to dipping seismic reflections. Once dip-steering re-orients the search parallel to dipping reflections, the calculation compares the same parts of the seismic wavelet, and is able to correctly assign high correlation or low discontinuity to continuous reflections. If these reflections are cut by a discontinuity such as a fault or channel margin, this discontinuity is imaged much more clearly because of the contrast to the continuous reflections.

Prospective hydrocarbon reservoirs often have steep dips because they often are located at anticlines or inclined fault blocks. Dip-steering provides better images of discontinuities in these prospects. This enhances the ability to add reserves or make discoveries and produce complexly faulted traps. Easier and more efficient interpretation of complex fault networks should lead to cost reduction and performance improvement.

Bahorich and Farmer received U.S. Pat. No. 5,563,949, "Method of Seismic Signal Processing and Exploration", issued Oct. 8, 1996. This patent is commonly known as the "coherence cube" patent. Bahorich and Farmer also obtained a continuation of this patent in U.S. Pat. No. 5,838,564, "Apparatus for Seismic Signal Processing and Exploration", issued Nov. 17, 1998.

Bahorich and Farmer's '949 patent describes a method for converting a fully processed 3-D seismic data volume into a cube of coherence measurements. According to their method, the 3-D data volume is divided into a plurality of horizontal slices, and each horizontal slice is further divided into a plurality of cells, each of which contains portions of at least three seismic data traces. As described in the '949 patent, these at least three traces in each cell comprise a reference trace, an in-line trace, and a cross-line trace. The in-line trace and the cross-line trace are each compared to the reference trace in each cell using a measure of coherency. Then the in-line and cross-line coherency measures are combined to obtain a single value that is representative of the coherence of the three seismic traces for each cell. This process is repeated for every cell, using every trace in the 3-D seismic volume as a reference trace, in order to obtain a 3-D cube of coherence measurements. Bahorich and Farmer's '564 patent describes the corresponding apparatus for carrying out the process of their '949 patent.

Bahorich and Farmer's patented technique combines information from more than one correlation direction at each data sample in the 3-D seismic data volume, thereby highlighting structural and stratigraphic information along multiple azimuths. According to Bahorich and Farmer, in their invention "the concept of cross-correlation is extended to two dimensions by taking the geometric means between the classical one dimensional cross-correlations" (U.S. Pat. No. 5,563,949, column 4, lines 17–20). This technique has limitations, however. Combining information from different correlation directions may effect the image clarity of the structural and stratigraphic features. This decrease in clarity can make it more difficult to extract structural and stratigraphic information in automated mapping processes. In addition, the computational complexity of this procedure is significantly greater than the traditional method using classical one-dimensional cross-correlations. Further, Bahorich and Farmer's '949 and '564 patents do not take into account the presence of reflection dip in the seismic data.

Higgs and Luo received U.S. Pat. No. 5,724,309 "Method for Geophysical Processing and Interpretation Using Instantaneous Phase and Its Derivatives and Their Derivatives", issued Mar. 3, 1998. Higgs and Luo's '309 patent describes a related technique for interpretation of faults and stratigraphic features. The technique uses instantaneous phase and its spatial derivatives to determine values of spatial frequency, instantaneous frequency, dip magnitude and dip azimuth. These values are plotted to produce a derivative seismic volume that highlights subsurface changes. The main advantage of this technique is its computational speed. However, the instantaneous phase and frequency images tend to be of lower resolution than traditional amplitude-derived cross-correlation images. A similar technique was also published by Hardage et al., 1998, "3-D Instantaneous Frequency used as a Coherency/Continuity Parameter to Interpret Reservoir Compartment Boundaries Across an Area of Complex Turbidite Deposition", *Geophysics*, Vol. 63, No. 5, pp. 1520–1531. This technique uses instantaneous frequency images to define reservoir compartments by identifying facies boundaries. Neither of these two techniques discusses how to compensate for the presence of reflection dip in coherency calculations.

Gersztenkorn's International Patent Application No. PCT/US97/00249, "Method and Apparatus for Seismic Signal Processing", was published as International Publication No. WO 97/39367 on Oct. 23, 1997. This technique generates a covariance matrix for an ensemble of seismic traces and then estimates the degree of similarity between traces by estimating the largest eigenvalue of the covariance matrix. It identifies the maximum coherence component and therefore identifies structural and stratigraphic discontinuities in the data at all azimuths. The main disadvantage is that because this technique estimates eigenvalues of the covariance matrix for each time sample in the volume, it is computationally intensive. This method discloses another form of continuity calculation, but it does not compensate for the presence of reflection dip.

Marfurt, Kirlin, Farmer, and Bahorich received U.S. Pat. No. 5,930,730 "Method and Apparatus for Seismic Signal Processing and Exploration", issued Jul. 27, 1999. The '730 patent describes a method for identifying structural and stratigraphic features in three dimensions in the presence of reflection dip. After datumming is applied to remove a significant portion of the regional structural dip, a semblance calculation is applied as a function of time to multiple seismic traces in multiple directions to further estimate and correct for local dip. A maximum semblance cube is created that highlights structural and stratigraphic discontinuities, corrected for structural dips. Improved imaging is obtained in areas of higher structural dip and seismic noise. Unfortunately, this method is very computationally intensive.

Marfurt, Sudhaker, Gersztenkorn, Crawford, and Nissen have used a version of dip-steering for coherency calculations in their paper in Geophysics, Vol. 64, No. 1, pp. 104–111, January–February 1999, "Coherency Calculations in the Presence of Structural Dip". The technique described in this publication examines the similarity of multiple traces at various time lags to estimate the dip of reflectors. The x and y components of apparent dip are estimated at each point in the seismic data cube using a "semblance-based" algorithm. This algorithm calculates the semblance along various test dip/azimuth pairs and identifies the dip as that with the greatest calculated semblance. This estimate of dip is smoothed by either calculating its mean, median, or alpha-trimmed mean over a window approximately 10 times larger than the original window to obtain smooth apparent dip in the x and y directions. This step is intended to overcome the fact that some value of dip will be found across faults that does not correspond to the dip of the reflections on either side of the fault. After application of this filter, the adjacent reflection dips should dominate at the fault. These dip values are used to flatten the data and calculate coherency. An eigenvalue algorithm is used to calculate the similarity of traces in the locally averaged dip direction. The main advantage of this approach is the minimization of coherency artifacts due to the dip of reflectors and thus a sharpening of the image. However, this approach can be computationally intensive.

Sequence stratigraphy models the interplay of sedimentation, sea-level change, and subsidence in a geological setting. P. R. Vail et al. have described the importance of seismic sequence analysis to structural and stratigraphic interpretation in their paper "Seismic Stratigraphy and Global Change of Sea-level", AAPG Memoir 26, 1977. In stratigraphic interpretation, reflection patterns are the clues used to reconstruct the depositional environment. During the process of determining the depositional sequence, geologists often use seismic data to interpret stratigraphic horizons.

Pattern recognition and image processing have also been applied to automatic tracking of seismic horizons. Y. C. Cheng and S. Y. Lu have described a procedure called seismic skeletonization in their paper "The Binary Consistency Checking Scheme and its Applications to Seismic Horizon Detection", IEEE Transaction on Pattern Analysis and Machine Intelligence, Vol. II, No 4, 1989. In that paper, a correlation based on the similarity of seismic reflectors in the adjacent traces was used to extend the reflectors laterally. This procedure then fits straight-line segments to the continuous connected reflectors. The procedure goes further to employ a sorting process on the straight-line segments so that the bedding sequence of seismic reflectors would follow the rule of superposition in which younger beds lie on top of the older beds. The seismic skeletonization procedure also uses an iterative approach. Strong reflectors are tracked first, and then weak reflectors are tracked at the later iterations. The geological trend is thus incorporated into the result.

It can be seen from the foregoing that a need exists for a computationally efficient and accurate method for identifying structural and stratigraphic features in 3-D seismic data in the presence of reflection dip.

SUMMARY OF THE INVENTION

The present invention is a method for detecting structural and stratigraphic discontinuities in a volume of seismic data samples in the presence of reflection dip. A primary and at least one secondary direction are selected in the volume of seismic data samples. Skeleton patches are identified in the volume of seismic data samples in the primary and secondary directions. The skeleton patches comprise groups of connected seismic samples representing seismic horizons in the volume of seismic data samples. Apparent dip is calculated in the primary and secondary directions at each data sample within these identified skeleton patches. This creates a primary direction dip volume and at least one secondary direction dip volume, respectively, at corresponding data sample locations. A filter is applied to the primary and secondary direction dip volumes to fill in values at data sample locations not within the identified groups of skeleton patches. Finally, a discontinuity volume is determined from calculated one-dimensional, two-trace discontinuity values in the primary and secondary directions. The calculated apparent dips at corresponding data sample locations from the primary and secondary direction dip volumes determine which portions of the data samples to use in the corresponding discontinuity value calculations.

BRIEF DESCRIPTION OF THE DRAWINGS

The present invention and its advantages may be more easily understood by reference to the following detailed description and the attached drawings in which.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The present invention is a method of identifying structural and stratigraphic discontinuities in a 3-D seismic data volume containing dipping reflectors. The invention is related to the method described in U.S. Provisional Patent Application No. 60/197,587, filed Apr. 17, 2000. That application described a method for detecting structural and stratigraphic discontinuities in a 3-D volume of seismic data samples (hereafter referred to as the "discontinuity volume method"). One embodiment of the discontinuity volume method comprises the following steps:

(1) A plurality of directions in the 3-D volume of seismic data samples are selected in a sequential order.

(2) A series of sequentially less restrictive thresholds are defined.

(3) For each data sample in the 3-D volume, one-dimensional, two-trace discontinuity values are calculated for the data sample sequentially along the plurality of directions and the first of the calculated discontinuity values that satisfies the first threshold is stored in the output discontinuity volume.

(4) For data sample locations that did not receive a discontinuity value from step (3), the next less restrictive threshold in the series of thresholds is selected and are compared sequentially to the calculated discontinuity values and the first of the discontinuity values that satisfies the selected threshold is stored in the output discontinuity volume.

(5) Step (4) is repeated, using progressively less restrictive thresholds, until every data sample location in the output discontinuity volume has a corresponding discontinuity value.

A further embodiment of the discontinuity volume method of the previous application comprises the following steps:

(1) A plurality of directions are selected containing a primary direction and at least one secondary direction.

(2) For each seismic data sample in the 3-D data volume, one-dimensional, two-trace first discontinuity values are calculated along the primary direction.

(3) A series of sequentially less restrictive thresholds is defined, such that a significant portion, preferably at least approximately 10%, of the first discontinuity values satisfy the first threshold.

(4) This significant portion of first discontinuity values is then stored in an output discontinuity volume at the corresponding sample locations.

(5) For each remaining data sample in the data volume, one-dimensional, two-trace discontinuity values are calculated sequentially along the secondary directions and the first of the calculated discontinuity values that satisfies the first threshold is stored in the output volume.

(6) If none of the calculated discontinuity values satisfies the first threshold, then the next less restrictive threshold in the series of thresholds is selected and compared sequentially to the discontinuity values calculated along the primary and secondary directions and the first of the discontinuity values that satisfies the selected threshold is stored in the output discontinuity volume.

(7) Step (6) is repeated, using progressively less restrictive thresholds, until every data sample location in the output discontinuity volume has a corresponding discontinuity value.

The present invention is a method of identifying structural and stratigraphic discontinuities in a 3-D seismic data volume containing dipping reflectors. In the method of the present invention, discontinuity identification is improved by following the framework of seismic sequence stratigraphy. Once the seismic horizons are determined, the trend of the detected horizons can thus be used as a regional trend to guide the correlation of the nearby seismic samples. True structural and stratigraphic features such as faults and channels can then be sharply focused. Thus, the discontinuity of the seismic reflectors in the adjacent traces can be more accurately calculated without being confused by the apparent dip of the seismic reflectors. In the present invention, a modified version of the seismic skeletonization procedure is used to create dip volumes in specified search directions. For a specified primary or secondary search direction, each sample in a dip volume represents a shift up or down in the vertical direction to locate the corresponding sample in an adjacent trace along the specified search direction, to be used in the discontinuity calculation.

Figure 1:
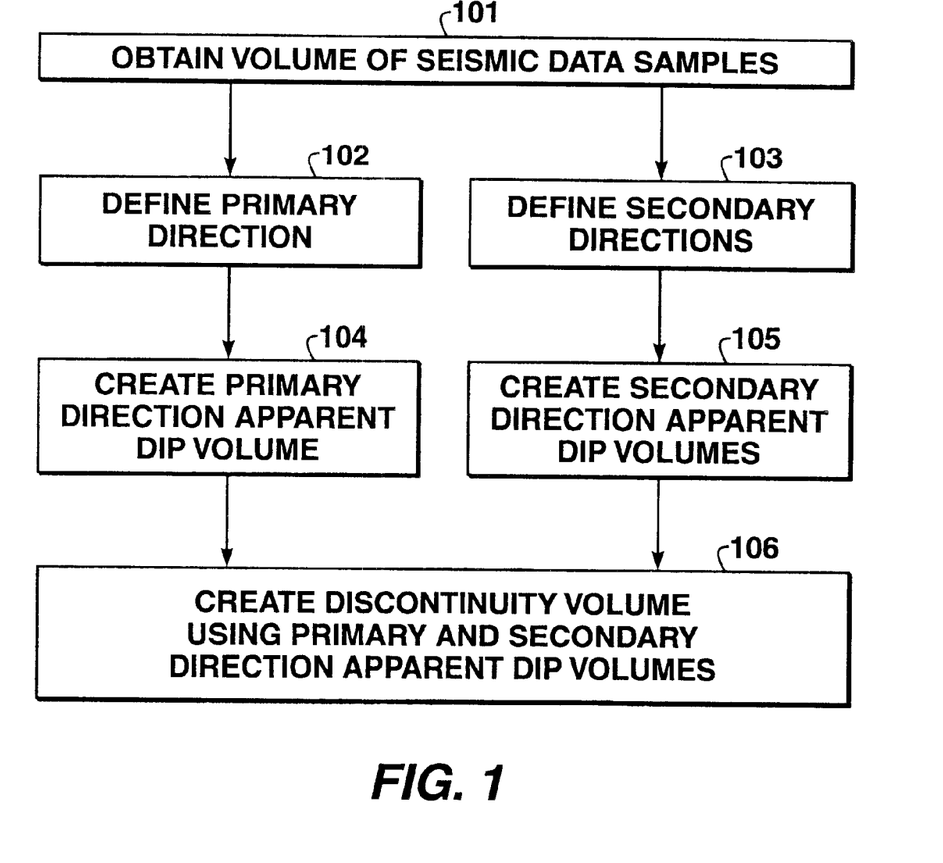
FIG. 1 is a flowchart illustrating the processing steps of an embodiment of the method of the present invention.

FIG. 1 is a flowchart illustrating the processing steps of one embodiment of the method of the present invention. First, at step 101, a volume of seismic data samples is obtained. Any type of seismic data may be used, but, preferably, the data will be seismic amplitude data in the form of fully processed seismic traces. Other appropriate types of seismic data include, but are not limited to, impedance data, curvature data, and prestack seismic data. Noise in the seismic data can effect the results of the method of the present invention. A median filter, preferably a 3×3 median filter, is usually applied to the volume of seismic data to minimize the effects of noise. The median filter is not required, but significantly improves the final results in almost all cases.

Second, at steps 102 and 103, a plurality of directions containing a primary direction and at least one secondary direction are defined in sequential order for the volume of seismic data samples from step 101. Since the seismic traces that contain the seismic data samples are usually situated in the vertical direction, the primary and secondary directions are typically chosen to be horizontal or parallel to the trend of the main formations in the seismic data. In a preferred embodiment, two directions are defined and the primary and secondary directions are labeled as the first and second directions, respectively. Preferably, the first and second directions are the orthogonal x and y directions, respectively, of the Cartesian coordinate system in which the seismic data are described. Alternatively, the first and second directions are the in-line and cross-line directions of the seismic survey used to collect the seismic data, which may differ from the x and y directions described above. In an alternative embodiment, four directions are defined. A primary direction is selected from among these four directions and is designated as the first direction. The remaining three directions are labeled as the second, third, and fourth directions, respectively. Preferably, these four directions comprise the in-line, cross-line and two diagonal directions. The primary and secondary directions are the directions in which both apparent dip and discontinuity values will be calculated.

At steps 104 and 105, apparent dip volumes are created for the primary direction and the secondary directions, respectively, as the search directions. A modified procedure of seismic skeletonization is used to find groups of connected seismic samples representing seismic horizons in each direction. These groups are called skeleton patches. The skeletonization of seismic reflectors consists of identifying the reflectors and then representing those reflectors by line segments. An iterative procedure of seismic skeletonization is performed. At the first iteration, strong reflectors are chosen and connected first in skeleton patches. In subsequent iterations, the weaker reflectors are chosen to extend the connections. At each iteration, the criterion to connect samples in the neighboring traces is based on the similarity measurement of attributes of reflectors, preferably amplitude. Alternatively, other attributes that could be used include, but are not restricted to, frequency, duration, and shape of the reflectors. In the created dip volumes, the samples located in skeleton patches on the detected seismic horizons are filled with an apparent dip value. The apparent dip value represents the up or down shift from the current sample to the connected samples in the adjacent trace along the primary or secondary direction being currently searched. After all the data samples lying on the detected seismic horizons have apparent dip values calculated, a filter is applied to the dip volume to remove the extreme values and fill in values at the samples not in the detected seismic horizons. In this approach, the regional dipping trends are captured at each sample based on the detected seismic horizons. The modified skeletonization procedure and the apparent dip calculation are described below in more detail in connection with FIGS. 2 and 3, respectively.

Finally, at step 106, a discontinuity volume is created from one-dimensional, two-trace discontinuity values calculated at data sample locations in the primary and secondary directions. The discontinuity value calculations use the apparent dip values from the filtered primary and secondary direction dip volumes calculated in steps 104 and 105 to insure that the appropriate portions of adjacent traces are being cross-correlated. To calculate a discontinuity value in the primary direction, the dip value for a target data sample location is retrieved from the primary direction dip volume. The discontinuity calculation is then made between the target data sample and the data sample location that is above or below the target data sample location by the apparent dip value specified by the primary direction dip volume. Similarly, the same discontinuity calculation is applied to the secondary directions using the apparent dip values in the secondary direction dip volumes.

Any suitable method may be used to calculate the discontinuity volume of step 106. However, preferably, this discontinuity volume is calculated by the method described in co-owned U.S. provisional patent application with serial No. 60/197,587, described above. Thus, one-dimensional, two-trace first discontinuity values are calculated along the primary direction for each seismic data sample in the 3-D data volume. These discontinuity values are calculated using the apparent dip values from the corresponding sample locations in the primary direction dip volume. Next, a series of sequentially less restrictive thresholds is defined, such that a significant portion, preferably at least approximately 10%, of the first discontinuity values satisfy the first threshold. This significant portion of first discontinuity values is then stored in an output discontinuity volume at the corresponding sample locations. The following steps are then repeated for each remaining data sample until that sample has a value stored at the corresponding sample location in the output discontinuity volume. One-dimensional, two-trace discontinuity values are calculated for the sample sequentially along the secondary directions and the first of the calculated discontinuity values that satisfies the first threshold is stored in the output volume. Again, these discontinuity values are calculated using the apparent dip values from the corresponding sample locations in the appropriate secondary direction dip volumes. If none of the calculated discontinuity values satisfies the first threshold, then the next less restrictive threshold in the series of thresholds is selected. The discontinuity values calculated along the primary and secondary directions are compared sequentially to the selected threshold and the first of the discontinuity values that satisfies the selected threshold is stored in the output discontinuity volume. This process is repeated until a discontinuity value has been stored in each sample location in the output discontinuity volume. The discontinuity value method does not calculate discontinuities at all sample locations for all directions and does not combine calculated discontinuities from different directions at sample locations. Thus, this method is not as computationally intensive as many of the other methods described above.

Figure 2:
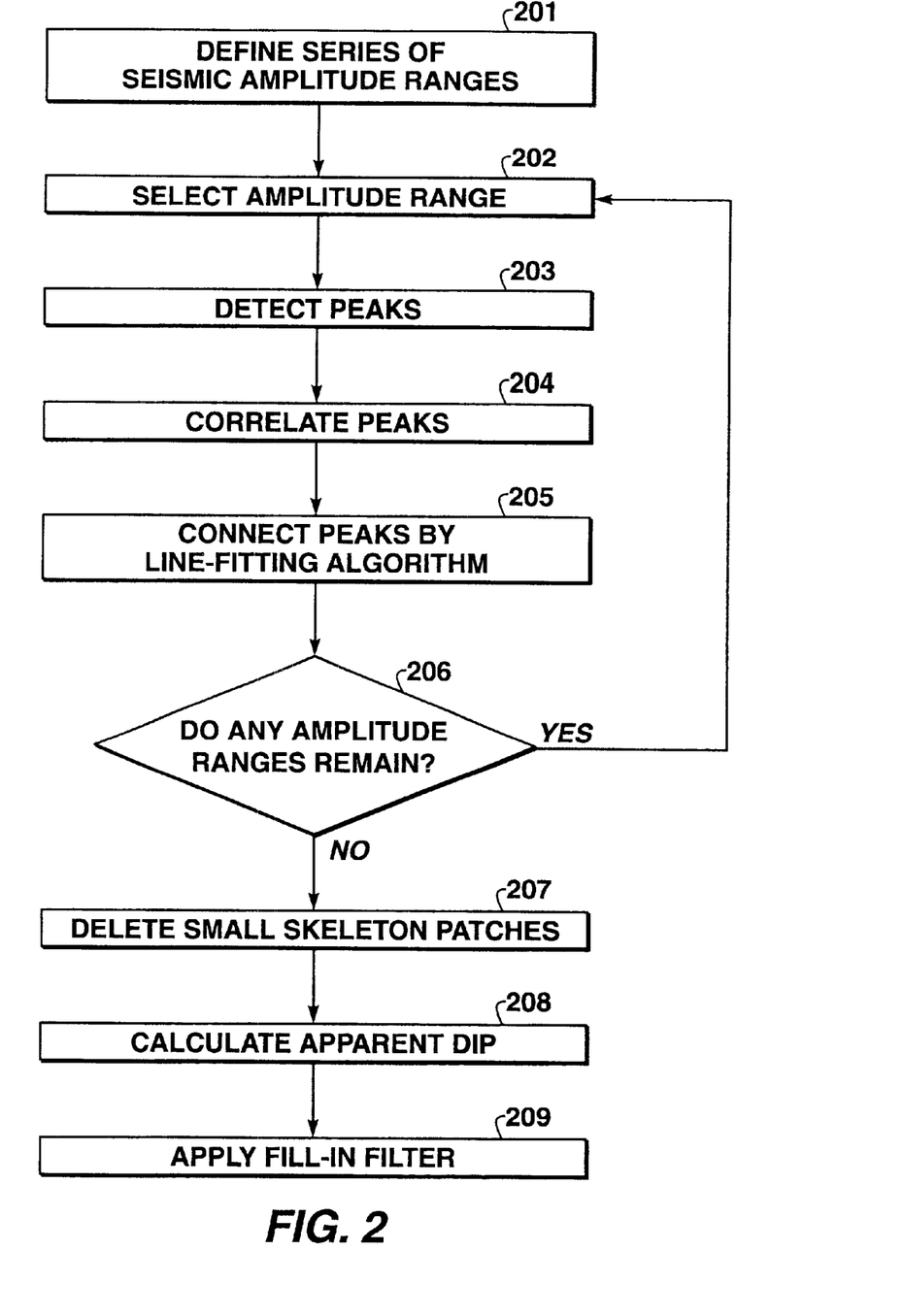
FIG. 2 is a flowchart illustrating the processing steps for creating an apparent dip volume in the method of the present invention.

FIG. 2 is a flowchart illustrating the processing steps for creating apparent dip volumes, as in steps 104 and 105 of FIG. 1, using a modified form of seismic skeletonization. The apparent dips will be determined along one of the primary or secondary directions from steps 102 and 103 of FIG. 1, depending upon which primary or secondary direction dip volume is being created. First, at step 201, a series of successively less restrictive ranges for seismic amplitudes is defined. These ranges will determine the size of peaks or troughs in seismic traces that define a continuous seismic horizon. Peaks and troughs are the positive and negative amplitude portions of the seismic trace, respectively. Although the method of the present invention could be practiced with both peaks and troughs, it will be described in terms of peaks. Using a series of successively less restrictive ranges allows an iterative process that starts with the best defined portions of seismic horizons and uses them to guide the selection of less well defined portions.

At step 202, a peak detection process is performed. In this process, for each seismic trace in the volume of seismic data samples, groups of adjacent samples with peaks satisfying the defined range of seismic amplitudes from step 201 are detected. During peak detection, the peaks are listed for each seismic trace and the peak attributes are recorded for later correlation use. Some of the attributes used could be location of the peak, area of the peak, average amplitude of the peak, etc. At step 203, a peak correlation process is performed. This process uses the lists of peaks along each trace from step 202 to derive a set of reflectors that run across these traces. The correlation step is performed for each peak in a trace with peaks in the neighboring traces based on a predefined similarity measurement based on the previously recorded peak attributes. Peaks belonging to the same reflector are considered in the same strata and labeled by the same number. In the case of junctions, branches, or missing peaks occurring from one trace to the next trace, the connection will terminate at this peak. This process is repeated for each trace in the 3-D volume of seismic data samples. The traces are preferably scanned from one side of the volume to the opposite side of the volume. Alternatively, the traces could be scanned outwards toward the opposite sides of the volume, starting from the trace with the largest peak amplitude.

At step 204, a line-fitting algorithm is performed. At each peak, a point representing the peak is recorded. Preferably, the location of the maximum amplitude occurring is used. The representative points are connected by straight-line segments. The connected peaks are thus represented by a set of line segments called a skeleton patch. Each line segment connects two peaks and the two end points of the patch represent the terminations of the connection. The number of connected line segments in a skeleton patch is called the length of the skeleton patch. Thus, the whole 3-D volume is represented by a group of isolated individual skeleton patches.

Figure 4:
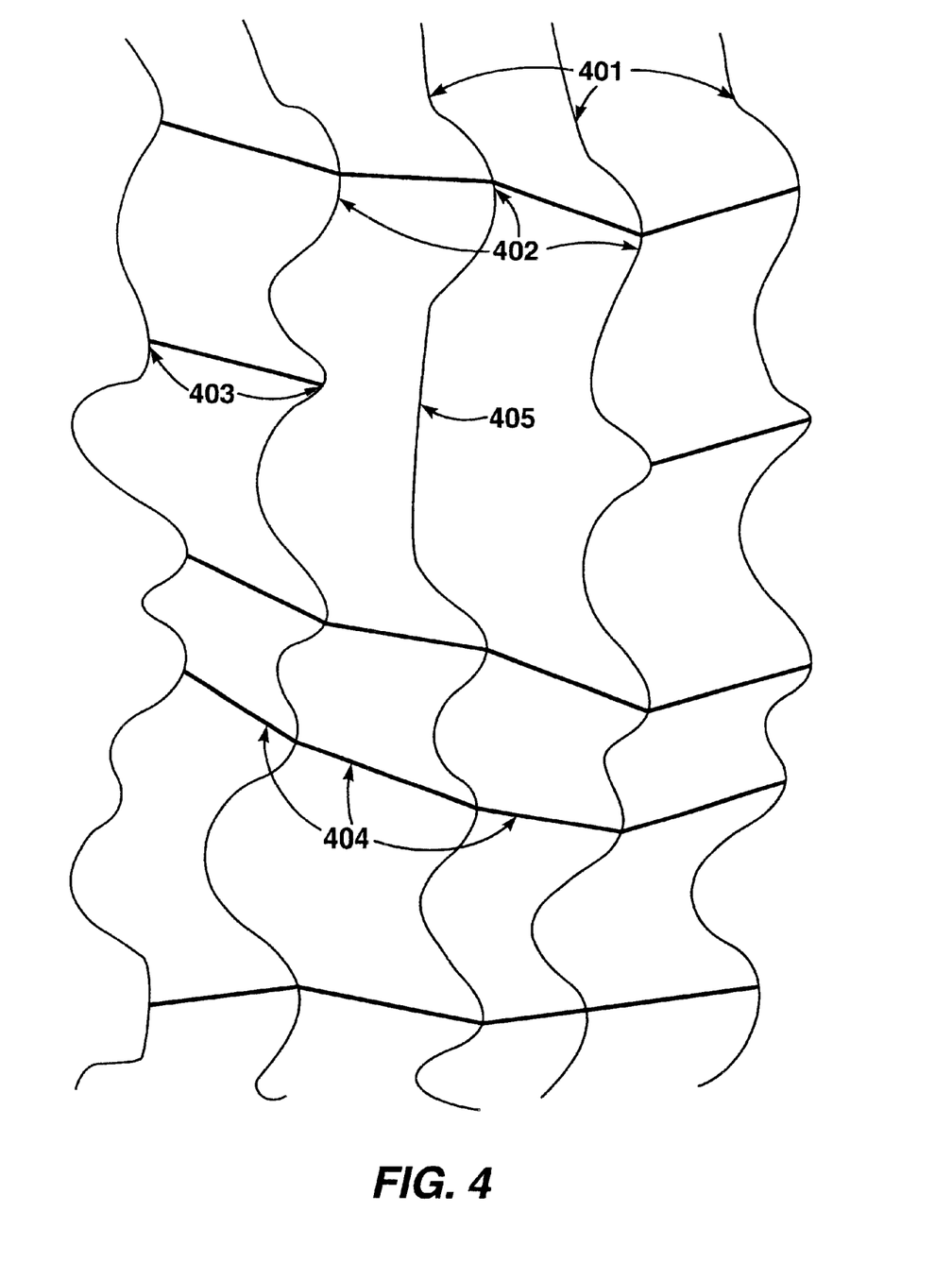
FIG. 4 is a view of adjacent seismic traces, illustrating the process of constructing skeleton patches.

FIG. 4 illustrates the previous steps in the process of constructing skeleton patches. A series of adjacent vertical seismic traces arranged along one search direction are indicated by 401. Two adjacent peaks, as detected by step 203 of FIG. 2, are indicated by 402. The points representing two adjacent peaks, as recorded in step 205 of FIG.2, are indicated by 403. Straight-line segments connecting the representative points, as found by the line-fitting algorithm of step 205 of FIG. 2, are indicated by 404. These line segments will define the skeleton patches. A missing peak, as detected by the peak correlation process of step 204 of FIG. 2, is indicated by 405.

Returning to FIG. 2, steps 202 to 205 will be repeated for each of the successively less restricted ranges of seismic amplitude from step 201. Since a less restricted condition will include more peaks in steps 202 and 203, previously terminated skeleton patches can be extended. More low amplitude and continuous reflectors can thus be included in the skeleton patches. Thus, in step 206, it is determined if any seismic amplitude ranges from step 201 remain. If ranges remain, then the process returns to step 202 to iterate steps 202 to 205 with the next less restrictive range of seismic amplitudes in the series. If no ranges remain, then the process continues on to step 207.

In step 207, small skeleton patches with length less than a threshold value, which can be user-specified or set automatically, are deleted to reduce noise. In step 208, apparent dip is calculated for each sample location if this sample is located in one of the skeleton patches. The dip is determined by the vertical shift from this sample location to the location of a connected end point of a line segment to a correlated peak in the next trace, following along the primary or secondary direction of the dip volume being created. Only a sample that has a connection in the current direction being searched will be recorded. This process of calculating apparent dip is described in more detail in the discussion of FIG. 3, below.

In step 209, a filter is applied to the dip volume created from step 201 to 208 to fill in values for data sample locations in the dip volume that do not originally have an identified connected group. The filter places a value in empty data sample locations that is preferably calculated as a median or average of values in nearby filled data sample locations. Once all data sample locations are filled, the filtered dip volumes are complete.

Figure 3:
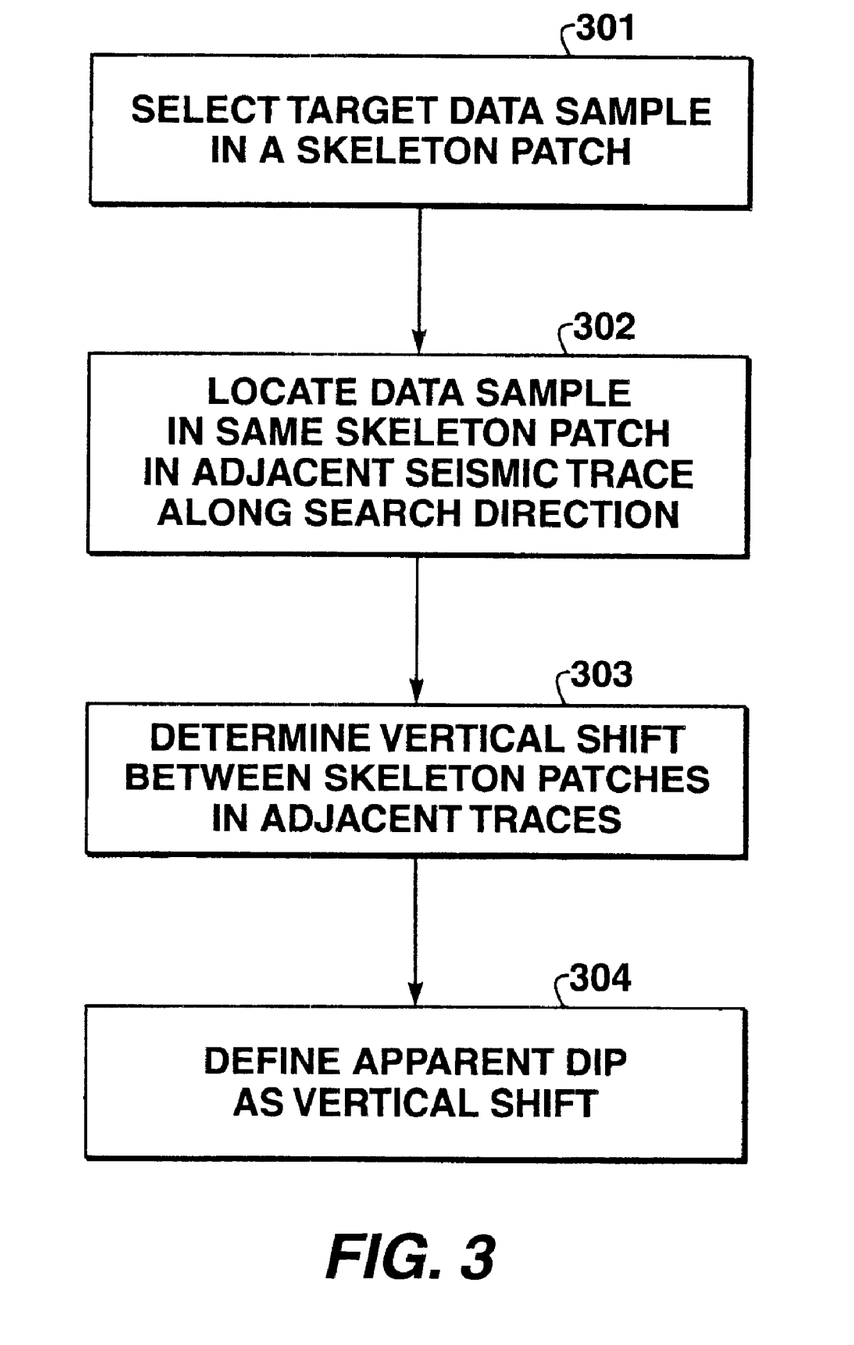
FIG. 3 is a flowchart illustrating the processing steps for calculating apparent dip in the method of the present invention.

FIG. 3 is a flowchart illustrating the processing steps for calculating apparent dip, as in step 208 of FIG. 2. The apparent dip will be determined along one of the primary or secondary directions from steps 102 and 103 of FIG. 1, depending upon which primary or secondary direction dip volume the apparent dip is being calculated for. In step 301, a target data sample is located that is in a skeleton patch along the primary or secondary direction currently being searched. In step 302, a data sample is located in the same skeleton patch in an adjacent seismic trace along the primary or secondary direction currently being searched. In step 303, the vertical shift in number of data samples between the selected and located data samples is determined. This vertical shift is determined by counting the number of data samples up or down between the selected and located data sample locations. In step 304, apparent dip is then defined as the vertical shift in data samples between the selected and located data sample locations. In this manner, apparent dip is calculated in both the primary and secondary directions to create primary and secondary direction apparent dip volumes, respectively.

Although the invention uses the seismic skeletonization process as the preferred way to derive dip volumes, the dip-steered discontinuity process described in this invention is not limited thereto. On the contrary, it is intended to cover other alternate ways of deriving the dip volumes.

EXAMPLE

Figure 5:
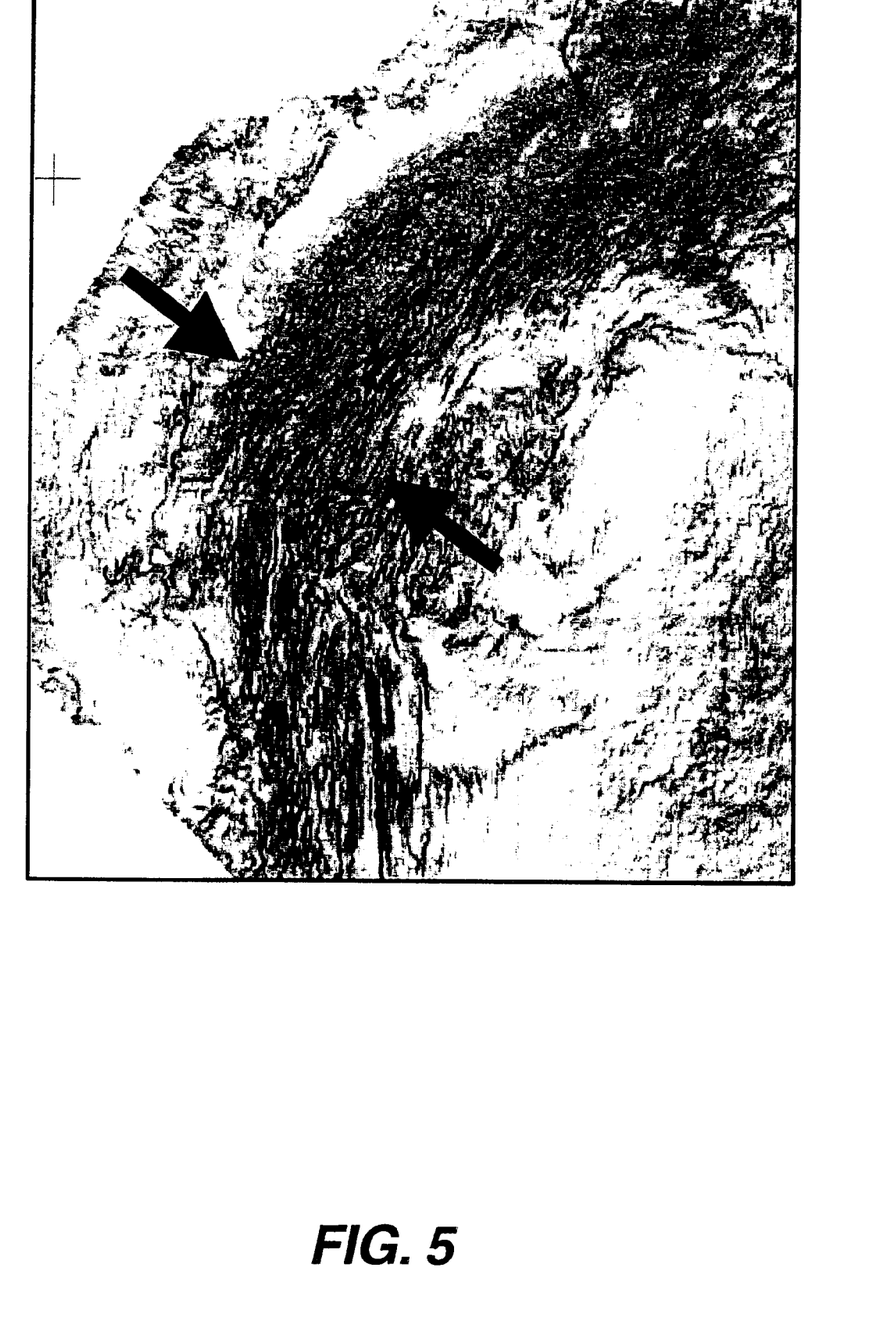
FIG. 5 is an example discontinuity time slice, processed using discontinuity calculations alone.
Figure 6:
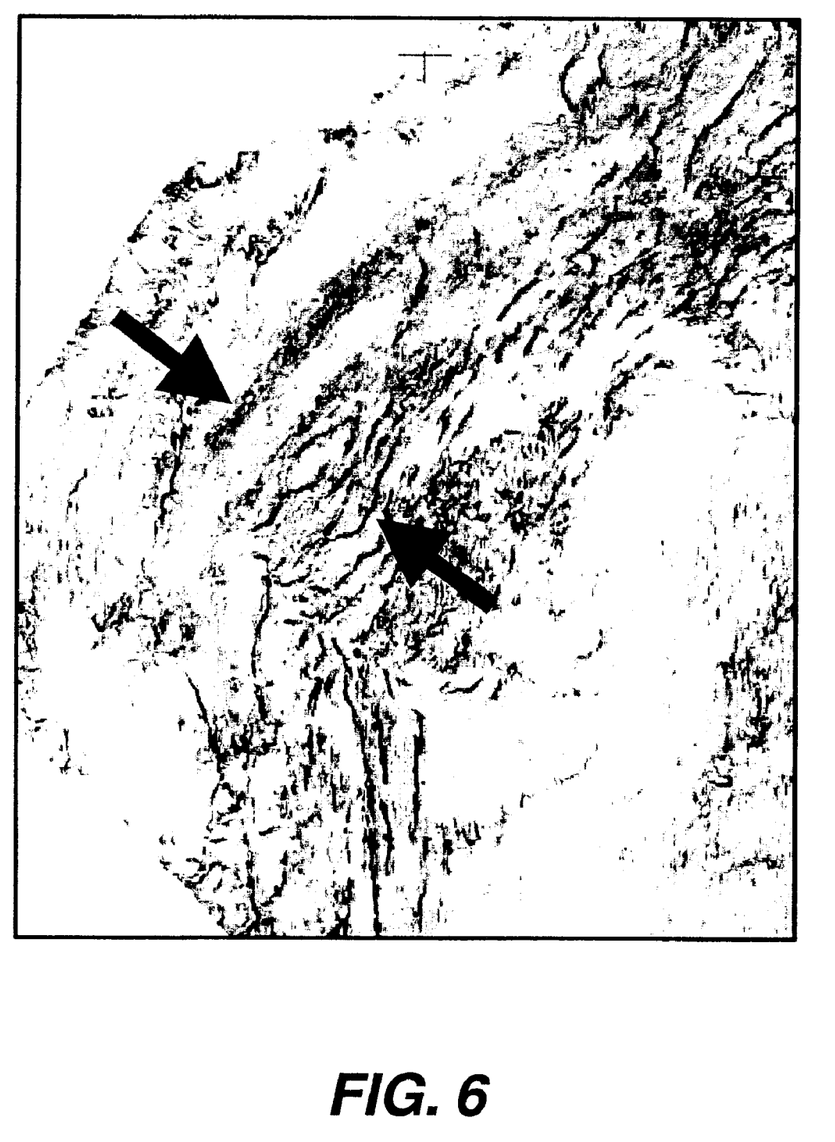
FIG. 6 is an example discontinuity time slice, processed using dip-steered discontinuity calculations.

FIGS. 5 and 6 show discontinuity time slices from a field in south Texas, processed using discontinuity calculations alone and dip-steered discontinuity calculations, respectively. The NE-SW trending zone between the two arrows comprises steeply-dipping fault blocks, separated by a complex network of faults. This is the crest of the anticline that defines the productive field. The dip-steered discontinuity volume illustrated in FIG. 6 provides much clearer images of the faults because the apparent discontinuity created by steep dips has been removed.

It should be understood that the invention is not to be unduly limited to the foregoing which has been set forth for illustrative purposes. Various modifications and alternatives will be apparent to those skilled in the art without departing from the true scope of the invention, as defined in the following claims.

We claim:

1. A method for detecting structural and stratigraphic discontinuities in a volume of seismic data samples, comprising the steps of:

selecting a primary direction and at least one secondary direction in the volume of seismic data samples;

identifying skeleton patches in the primary and secondary directions in the volume of seismic data samples, the skeleton patches comprising groups of connected seismic samples representing seismic horizons in the volume of seismic data samples;

calculating apparent dip in the primary and secondary directions at each data sample within the identified skeleton patches, creating a primary direction dip volume and secondary direction dip volumes, respectively, at corresponding data sample locations;

applying a filter to the primary direction and secondary direction dip volumes to fill in values at the data sample locations not within the identified skeleton patches; and determining a discontinuity volume from one-dimensional, two-trace discontinuity values calculated in the primary and secondary directions at data sample locations, wherein the calculated apparent dips at corresponding data sample locations in the primary and secondary direction dip volumes determine which portions of the data samples to use in the corresponding discontinuity value calculations.

2. The method of claim 1, further comprising the step of:

applying a 3×3 median filter to the volume of seismic data samples before the step of selecting directions, to minimize noise.

3. The method of claim 1, wherein the number of primary and secondary directions is two.

4. The method of claim 3, wherein the primary and secondary directions are the x and y directions, respectively, of a Cartesian coordinate system in which the volume of seismic data samples is described.

5. The method of claim 3, wherein the primary and secondary directions are the cross-line and in-line directions of a seismic survey used to collect the volume of seismic data samples.

6. The method of claim 1, wherein the number of primary and secondary directions is four.

7. The method of claim 6, wherein the primary and secondary directions are the cross-line, in-line, and two diagonal directions of a seismic survey used to collect the volume of seismic data samples.

8. The method of claim 1, wherein the step of identifying skeleton patches comprises the steps of:

selecting a search direction from among the primary and secondary directions;

defining a range of seismic amplitudes;

listing groups of seismic data samples adjacent in the search direction with peaks satisfying the range of seismic amplitudes;

recording peak attributes of the peaks of the listed groups of data samples;

correlating peaks in the listed groups of data samples according to similarity measures of the peak attributes;

connecting correlated peaks by a line-fitting algorithm; and defining skeleton patches as groups of connected peaks.

9. The method of claim 8, further comprising the steps of:

selecting a threshold value; and deleting the skeleton patches smaller than the threshold value.

10. The method of claim 1, wherein the step of calculating apparent dip further comprises the steps of:

selecting a search direction from among the primary and secondary directions;

selecting a target data sample that is within a skeleton patch in the search direction;

locating a data sample in the same skeleton patch in an adjacent seismic trace along the search direction;

determining a vertical shift in number of data samples between the selected and located data samples; and defining apparent dip as the vertical shift in data samples between the selected and located data samples.

11. The method of claim 1, wherein the step of determining a discontinuity volume further comprises the steps of:

selecting a search direction from among the primary and secondary directions;

selecting a target data sample in the volume of seismic data samples;

retrieving a dip value for the corresponding target data sample location, from the dip volume for the selected search direction; and calculating a one-dimensional, two-trace discontinuity value between the target data sample and the data sample in the corresponding adjacent seismic trace, in the search direction, that is above or below the target data sample location by the amount given by the retrieved dip value.

12. The method of claim 1, wherein the step of determining a discontinuity volume further comprises the steps of:

(a) calculating one-dimensional, two-trace first discontinuity values along the primary direction for each seismic data sample, wherein the calculated apparent dips at corresponding data sample locations in the primary direction dip volume determine which portions of the data samples to use in the corresponding discontinuity value calculations;

(b) defining a series of sequentially less restrictive thresholds, such that a significant portion of the first discontinuity values satisfy the first threshold and storing this significant portion of first discontinuity values in an output discontinuity volume at the corresponding sample locations; and (c) repeating the following steps for each remaining sample until the sample has a value stored at the corresponding sample location in the output discontinuity volume:

(1) calculating one-dimensional, two-trace discontinuity values for the sample sequentially along the secondary directions, wherein the calculated apparent dips at corresponding data sample locations in the secondary direction dip volumes determine which portions of the data samples to use in the corresponding discontinuity value calculations, and storing in the output discontinuity volume the first of the calculated discontinuity values that satisfies the first threshold;

(2) selecting the next less restrictive threshold in the series of thresholds; and (3) comparing the discontinuity values calculated along the primary and secondary directions sequentially to the selected threshold and storing in the output volume the first of the discontinuity values that satisfies the selected threshold.

13. The method of claim 12, wherein the significant portion of the first discontinuity values is at least approximately 10%.

* * * * *